United States Patent
Treuner et al.

[11] 3,926,980
[45] Dec. 16, 1975

[54] DITHIOCARBONYLTHIOACETYL CEPHALOSPORINS

[75] Inventors: Uwe D. Treuner, Regensburg; Hermann Breuer, Burgweinting, both of Germany

[73] Assignee: E. R. Squibb & Sons, Inc., Princeton, N.J.

[22] Filed: May 24, 1974

[21] Appl. No.: 473,123

Related U.S. Application Data

[63] Continuation-in-part of Ser. No. 272,228, July 17, 1972, Pat. No. 3,846,418, which is a continuation-in-part of Ser. No. 180,523, Sept. 14, 1971, abandoned.

[52] U.S. Cl........ 260/243 C; 260/332.2 A; 424/246
[51] Int. Cl.$^2$............... C07D 501/34; A61K 31/545
[58] Field of Search ............................... 260/243 C

[56] References Cited
UNITED STATES PATENTS
3,812,116  5/1974  Takano et al. .................. 260/243 C

OTHER PUBLICATIONS
Sassiver et al., Antimicrobial Agents & Chemeotherapy 1968 Ed. Hobby (1969) pp. 101–108.
Lewis et al., Antimicrobial Agents & Chemeotherapy 1968, Hobby Ed. (1969) pp. 109–114.

*Primary Examiner*—Nicholas S. Rizzo
*Assistant Examiner*—Diana G. Rivers
*Attorney, Agent, or Firm*—Lawrence S. Levinson; Merle J. Smith

[57] ABSTRACT

Dithiocarbonylthioacetyl cephalosporin derivatives of the formula

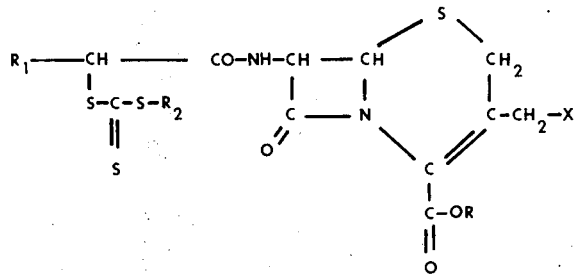

wherein R is hydrogen, lower alkyl, trimethylsilyl, alkali metal or

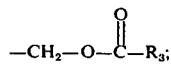

$R_1$ is thienyl; $R_2$ is a salt forming metal, lower alkyl or cyclo-lower alkyl; $R_3$ is lower alkyl or phenyl-lower alkyl; and X is hydrogen, hydroxy or lower alkanoyloxy, are useful as antibacterial agents.

6 Claims, No Drawings

DITHIOCARBONYLTHIOACETYL CEPHALOSPORINS

This application is a continuation-in-part of application Ser. No. 272,228, filed July 17, 1972, U.S. Pat. No. 3,846,418, issued Nov. 5, 1974 which in turn is a continuation-in-part of application Ser. No. 180,523, filed Sept. 14, 1971, now abandoned.

SUMMARY OF THE INVENTION

This invention relates to new dithiocarbonylthioacetyl cephalosporins of the formula (I)

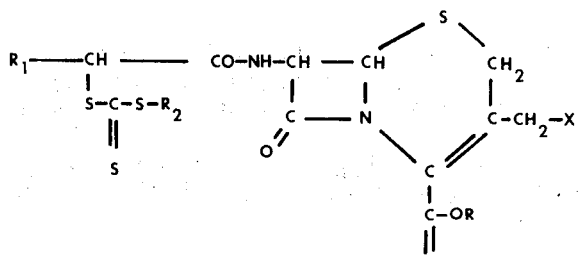

R represents hydrogen, lower alkyl, aralkyl, tri(lower alkyl)silyl, a salt forming ion or the group

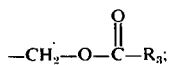

$R_1$ represents hydrogen, aryl, lower alkyl, cyclo-lower alkyl, cyclo-lower alkenyl, cyclo-lower alkadienyl, aralkyl or certain heterocyclic groups; $R_2$ represents a salt forming ion, lower alkyl, cyclo-lower alkyl, aryl or aralkyl; $R_3$ represents lower alkyl, aryl or aralkyl. X is hydrogen, hydroxy, lower alkanoyloxy, aroyloxy, aralkanoyloxy, the radical of a nitrogen base, a quaternary ammonium radical, or together X and R represent a bond linking carbon and oxygen in a lactone ring.

The preferred members within each group are as follows: R is hydrogen, lower alkyl, alkali metal, trimethylsilyl or

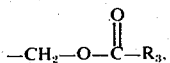

especially hydrogen, methyl, pivaloyloxy, sodium or potassium; $R_1$ is hydrogen, lower alkyl, phenyl, thienyl, furyl, oxazolyl, isoxazolyl or thiazolyl, especially phenyl; $R_2$ is lower alkyl, especially methyl or ethyl; $R_3$ is lower alkyl, preferably methyl or t-butyl and X is preferably hydrogen or acetoxy.

DETAILED DESCRIPTION OF THE INVENTION

The various groups represented by the symbols have the meanings defined below and these definitions are retained throughout this specification.

The cycloaliphatic groups are the four to six carbon alicyclics cyclobutyl, cyclopentyl and cyclohexyl as well as the monounsaturated and diunsaturated four to six carbon rings. The five and six carbon rings are preferred in each series with the 1,4-cyclohexadienyl group being especially preferred.

The aryl groups are monocyclic carbocyclic aryl groups including simply substituted members. By way of illustration, this includes the phenyl ring and simply substituted phenyl containing one to three substituents (preferably only one) such as the halogens (chlorine and bromine being preferred), lower alkyl groups such as those defined above, lower alkoxy groups, (i.e., lower alkyl groups of the type defined above attached to an oxygen), hydroxy, carboxy and the like. In the case of the last two named substituents there is preferably only one, especially in the para position of the phenyl. Illustrative are phenyl, o-, m- and p-chlorophenyl, o-, m- and p-bromophenyl, 3,4-dichlorophenyl, 3,5-dibromophenyl, o-, m- and p-tolyl, p-methoxyphenyl, 3,4,5-trimethoxyphenyl, p-hydroxyphenyl, p-carboxyphenyl and the like.

The aralkyl groups include a monocyclic carbocyclic aryl group attached to a lower alkyl group, both as defined above. Illustrative are benzyl, o-, m- or p-chlorobenzyl, o-, m- or p-bromophenyl, o-, m- or p-methylbenzyl, phenethyl, p-chlorophenethyl, 3,5-diethylbenzyl, 3,4,5-trichlorobenzyl and the like.

The lower alkanoyloxy, aroyloxy and aralkanoyloxy groups represented by X include the acyl group of acid esters. The lower alkanoyl radicals are the acyl radicals of lower fatty acids containing alkyl radicals of the type described above. The lower alkanoyloxy groups include, for example, acetoxy, propionyloxy, butyryloxy and the like. The aroyloxy groups are derived from monocyclic carbocyclic aryl groups of the kind described. Similarly the aralkanoyloxy groups consist of monocyclic carbocyclic aryl and alkanoyloxy radicals of the type described. X also represents the radical of an amine, e.g., an alkylamine like methylamine, ethylamine, dimethylamine, triethylamine, aralkylamine like dibenzylamine, N,N'-dibenzylpyridinium, pyridinium, 1-quinolinium, 1-picolinium, etc. X and R may also join together, as indicated above, to form a bond linking carbon and oxygen in a lactone ring.

The heterocyclic groups represented by $R_1$ are 5- to 6-membered monocyclic heterocyclic radicals (exclusive of hydrogen), including thienyl, furyl, oxazolyl, isoxazolyl and thiazolyl, as well as these heterocyclics with the substituents halo, lower alkyl (particularly methyl and ethyl), lower alkoxy (particularly methoxy and ethoxy) or phenyl.

The salt forming ions represented by R and $R_2$ may be metal ions, e.g., aluminum, alkali metal ions such as sodium or potassium, alkaline earth metal ions such as calcium or magnesium, or an amine salt ion, of which a number are known for this purpose, for example, dibenzylamine, N,N-dibenzylethylenediamine, methylamine, triethylamine, procaine, N-ethylpiperidine, etc.

The new dithiocarbonylthioacetylcephalosporins of this invention are produced by reacting a 7-aminocephalosporanic acid compound of formula II [which includes 7-aminocephalosporanic acid (7-ACA), 7-amino-3-desacetoxycephalosporanic acid (7-ADCA) and other derivatives] of the formula (II)

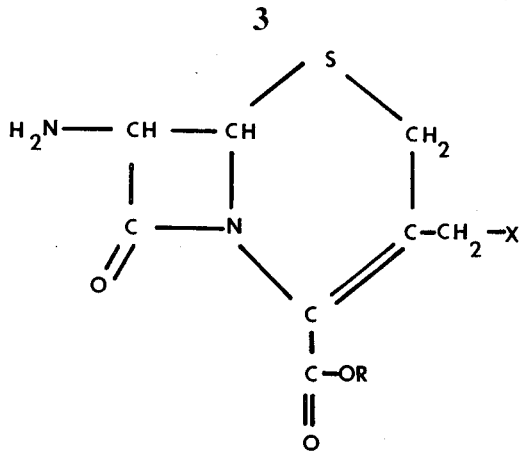

with a dithiocarbonylthioacetic acid of the formula (III)

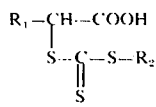

or an activated derivative of the former (II). The symbols have the meanings already defined.

The activated derivatives referred to include, for example, the reaction product with an anhydride forming reagent such as ethylchloroformate, benzoyl chloride, pivaloyl chloride, etc., or with bis-imidazolecarbonyl, dicyclohexylcarbodiimide, p-nitrophenol or the like.

The reaction between the 7-aminocephalosporanic acid compound and the dithiocarbonylthioacetic acid may be effected, for example, by dissolving or suspending the latter in an inert organic solvent such as chloroform, methylene chloride, dioxane, benzene or the like, and adding, at about room temperature or below, about an equimolar amount of an anhydride forming reagent, e.g., ethyl chloroformate, benzoylchloride or the like, or other activating compound such as dicyclohexylcarbodiimide, along with a salt forming organic base, such as triethylamine, pyridine or the like, followed, after an interval, by the addition of the 7-aminocephalosporanic acid compound. The product of the reaction is then isolated by conventional procedures, e.g., by concentration or evaporation of the solvent.

When R is the acyloxymethyl group

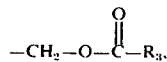

this group may be introduced into the 7-aminocephalosporanic acid moiety prior to the reaction with the dithiocarbonylthioacetic acid or the activated derivative by treatment with one to two moles of a halomethyl ester of the formula (IV)

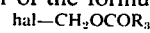

wherein hal is halogen, preferably chlorine or bromine, in an inert organic solvent such as dimethylformamide, acetone, dioxane, benzene or the like, at about ambient temperature or below.

As an alternative, a product of formula I may be produced by reacting a salt, e.g., an alkali metal salt of the formula (V)

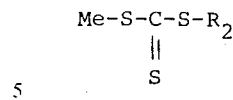

with a compound of the formula (VI)

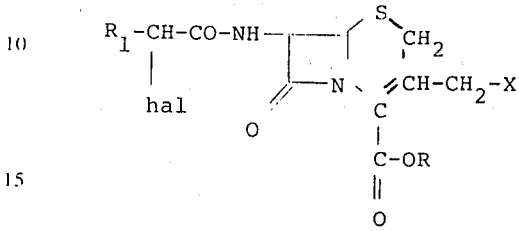

or derivative thereof in a solvent such as dimethylformamide. Me represents a metal, hal is halogen, preferably chlorine or bromine and R and $R_1$ are the same as above.

The dithiocarbonylthioacetic acid of formula III may be produced according to the following general method:

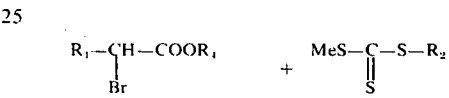

yields

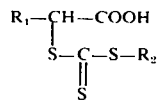

by a procedure analogous to that described by Bonner, Journ. Org. Chem. 33, 1831 (1968).

The symbols have the meanings already defined.

Further process details are also provided in the illustrative examples.

Certain of the compounds of this invention may exist in different optically active forms. The various stereoisomeric forms as well as the racemic mixtures are within the scope of the invention.

The compounds of this invention have a broad spectrum of antibacterial activity against both gram positive and gram negative organisms such as *Staphylococcus aureus*, *Salmonella schottmuelleri*, *Pseudomonas aeruginosa*, *Proteus vulgaris*, *Escherichia coli* and *Streptococcus pyogenes*. They may be used as antibacterial agents in a prophylactic manner, e.g., in cleaning or disinfecting compositions, or otherwise to combat infections due to organisms such as those named above, and in general may be utilized in a manner similar to cephalothin and other cephalosporins. For example, a compound of formula I or a physiologically acceptable salt thereof may be used in various animal species in an amount of about 1 to 200 mg/kg, daily, orally or parenterally, in single or two to four divided doses to treat infections of bacterial origin, e.g., 5.0 mg/kg in mice.

Oral forms give prompt high blood levels which are maintained for relatively long periods.

Up to about 600 mg. of a compound of formula I or a physiologically acceptable salt thereof may be incorporated in an oral dosage form such as tablets, capsules, or elixirs or in an injectable form in a sterile aqueous vehicle prepared according to conventional pharmaceutical practice.

They may also be used in cleaning or disinfecting compositions, e.g., for cleaning barns or dairy equipment, at a concentration of about 0.01 to 1% by weight of such compounds admixed with, suspended or dissolved in conventional inert dry or aqueous carriers for application by washing or spraying. They are also useful as nutritional supplements in animal feeds.

The following examples are illustrative of the invention. All temperatures are on the centigrade scale. Additional variations may be produced in the same manner by appropriate substitution in the starting material.

EXAMPLE 1

D,L-7-[2-[[(Ethylthio)thiocarbonyl]thio]-2-phenylacetamido]-cephalosporanic acid and potassium salt 3.6 g. (10 mmol.) of DL-7-α-(bromophenylacetamido)cephalosporanic acid are dissolved in 15 ml. of absolute dimethylformamide and then 1.8 g. (10 ml.) of potassium ethyltrithionate, dissolved in 15 ml. of dimethylformamide are added with stirring. The temperature is controlled by cooling so that the mixture does not go above 40°. After 10 minutes, the reaction solvent is poured into 350 ml. of cold water and extracted twice with 200 ml. of ethyl acetate each time. The ethyl acetate extract is dried with sodium sulfate and distilled off in vacuo. The oily residue is crystallized by treatment with ether and petroleum ether. The product, DL-7-[2-[[(ethylthio)thiocarbonyl]thio]-2-phenylacetamido]-cephalosporanic acid, is obtained in 83% yield, m.p. 77°–80°. Solution of the acid in a small amount of n-butanol, addition of an equivalent amount of potassium 2-ethylhexanoate and then adding ether gives the potassium salt as a pale yellow powder, m.p. 148° (dec.). The sodium salt is formed similarly.

The following additional products are similarly obtained (melting points are for salt):

7-[2-[[(methylthio)thiocarbonyl]thio]-2-phenylacetamido]-cephalosporanic acid and potassium salt, m.p. 153° (dec.).

7-[2-[[(cyclohexylthio)thiocarbonyl]thio]-2-phenylacetamido]-cephalosporanic acid and potassium salt (hydrate), m.p. 143° (dec.).

7-[2-[(ethylthio)thiocarbonyl]thioacetamido]cephalosporanic acid and potassium salt, m.p. 140°.

7-[2-[(n-butylthio)thiocarbonyl]thioacetamido]-cephalosporanic acid and potassium salt, m.p. 145°.

7-[2-[(cyclohexylthio)thiocarbonyl]thioacetamido]-cephalosporanic acid and potassium salt, m.p. 125°.

7-[2-[(methylthio)thiocarbonyl]thioacetamido]-cephalosporanic acid and potassium salt, m.p. 142°.

7-[2-[(benzylthio)thiocarbonyl]thioacetamido]-cephalosporanic acid and potassium salt, m.p. 140°.

7-[2-[[(benzylthio)thiocarbonyl]thio]-2-phenylacetamido]-cephalosporanic acid and potassium salt, m.p. 133°.

7-[2-[[(methylthio)thiocarbonyl]thio]-2-(3-thienyl)-acetamido]-cephalosporanic acid, m.p. 70°.

The following additional products having the formula (c) in the table are obtained by the procedure of Example 1 by substituting for the DL-7-α-(bromophenylacetamido)cephalosporanic acid, the starting material (a), and for the potassium ethyltrithionate, the starting material (b) with the substituents indicated in the table:

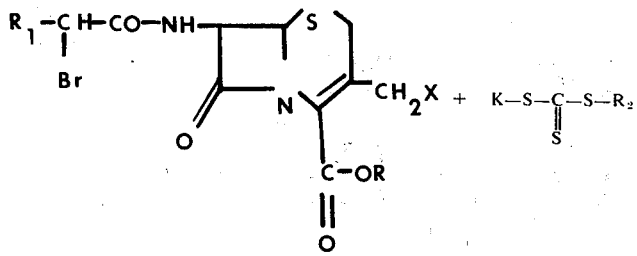 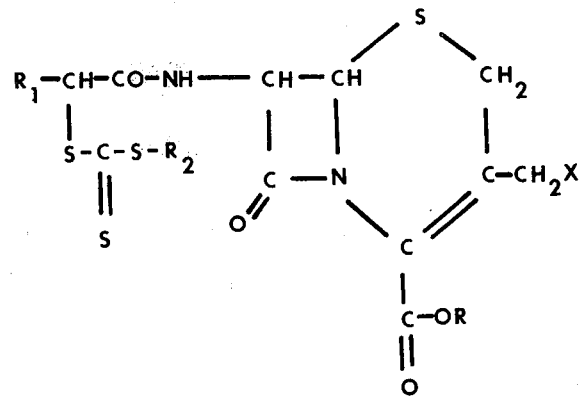

| Example | (a) R | (b) R₁ | (c) R₂ | X |
|---|---|---|---|---|
| 2 | CH₃ | H | CH₃ | H |
| 3 | C₂H₅ | CH₃ | C₂H₅ | OH |
| 4 | CH₃ | C₃H₇ | C₂H₅ | pyridinium |
| 5 | —CH₂OC(O)—CH(CH₃)₂ | C₆H₅CH₂ | C₆H₅CH₂ | OCOCH₃ |
| 6 | —CH₂OC(O)—C₆H₅ | 4—ClC₆H₄ | H | OCOCH₃ |
| 7 | C₂H₅ | 3,4—(CH₃O)₂C₆H₃ | C₂H₅ | H |
| 8 | C₂H₅ | 3,4,5—(CH₃O)₃C₆H₂ | C₂H₅ | OCOCH₃ |
| 9 | Na | 4—CH₃C₆H₄ | Na | OCOCH₃ |
| 10 | lactone (+X) | 3,4—(Br)₂C₆H₃CH₂ | H | lactone (+R) |
| 11 | C₂H₅ | 2,4—(Cl)₂C₆H₃ | C₂H₅ | OCOCH₃ |

-continued
| Example | (a) R | (b) R₁ | (c) R₂ | X |
|---|---|---|---|---|
| 12 | $C_2H_5$ | 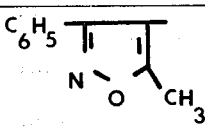 | $C_2H_5$ | $OCOCH_3$ |
| 13 | $C_2H_5$ |  | $C_2H_5$ | $OCOCH_3$ |
| 14 | $C_6H_5CH_2$ |  | $C_6H_5CH_2$ | $OCOCH_2C_6H_5$ |
| 15 | $CH_2OC-C(CH_3)_3$ $\phantom{CH_2O}\overset{O}{\|}$ | $C_6H_5$ | $C_6H_5$ | H |
| 16 | $Si(CH_3)_3$ |  | n-butyl | H |
| 17 | H |  |  | $OCOCH_3$ |
| 18 | H | 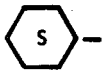 | $C_2H_5$ | $OCOCH_3$ |
| 19 | K | 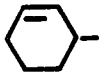 | $CH_3$ | H |
| 20 | K |  | $C_6H_5$ | H |
| 21 | H |  | $C_2H_5$ | H |
| 22 | H |  | 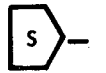 | $OCOCH_3$ |
| 23 | H |  | $CH_3$ | $OCOCH_3$ |
| 24 | K |  | $C_2H_5$ | H |
| 25 | K |  | $CH_3$ | H |
| 26 | H |  | $CH_3$ | H |

What is claimed is:
1. A compound of the formula

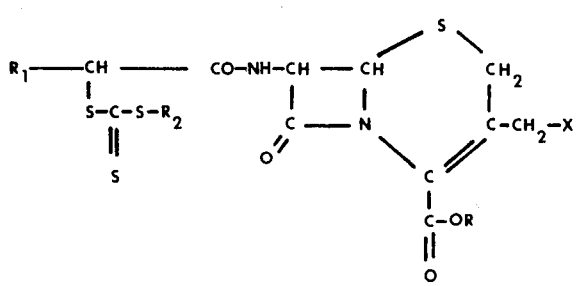

wherein R is hydrogen, lower alkyl, trimethylsilyl, alkali metal or

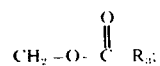

$R_1$ is thienyl; $R_2$ is lower alkyl; $R_3$ is lower alkyl or phenyl-lower alkyl; and X is hydrogen, hydroxy or lower alkanoyloxy.

2. A compound as in claim 1 wherein R is hydrogen or alkali metal; $R_2$ is lower alkyl; X is hydrogen or acetoxy.

3. A compound as in claim 1 wherein R is hydrogen; $R_1$ is 3-thienyl; $R_2$ is lower alkyl; and X is acetoxy.

4. A compound as in claim 3 wherein the lower alkyl group is methyl.

5. A compound as in claim 1 wherein R and X each is hydrogen; $R_1$ is 3-thienyl; and $R_2$ is lower alkyl.

6. A compound as in claim 5 wherein the lower alkyl group is methyl.

* * * * *